Oct. 15, 1957 H. J. WADDELL 2,809,521
DIAPHRAGM FOR GAS METERS
Filed June 4, 1954 3 Sheets-Sheet 1
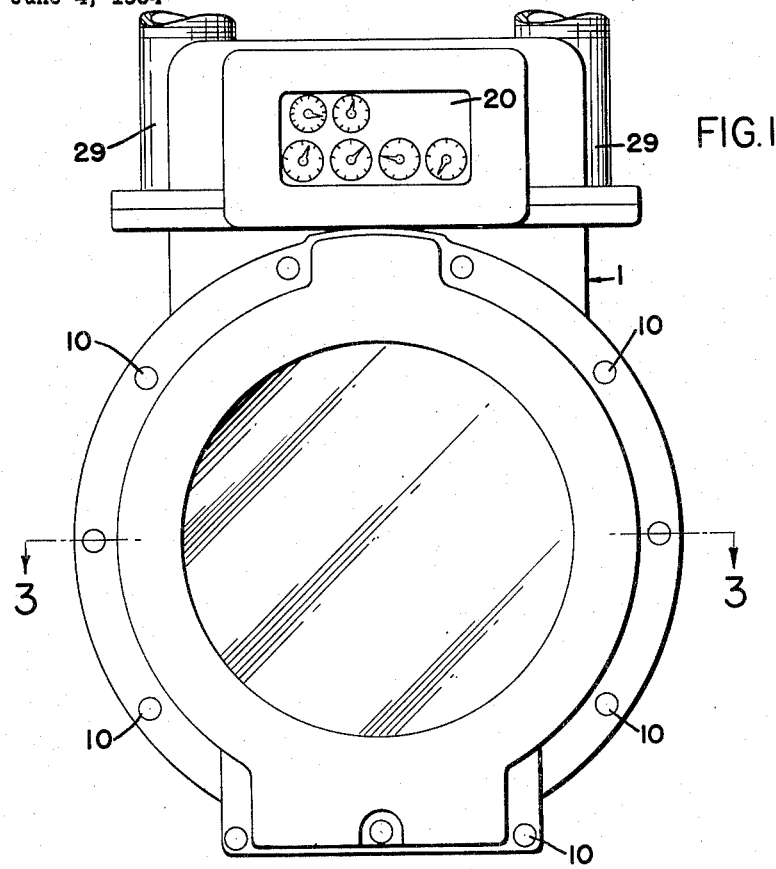
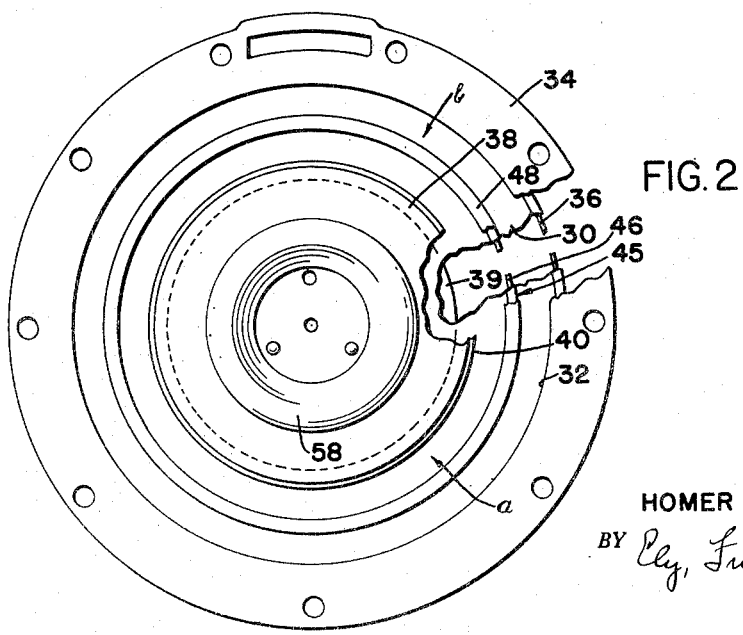
INVENTOR.
HOMER J. WADDELL
ATTORNEYS

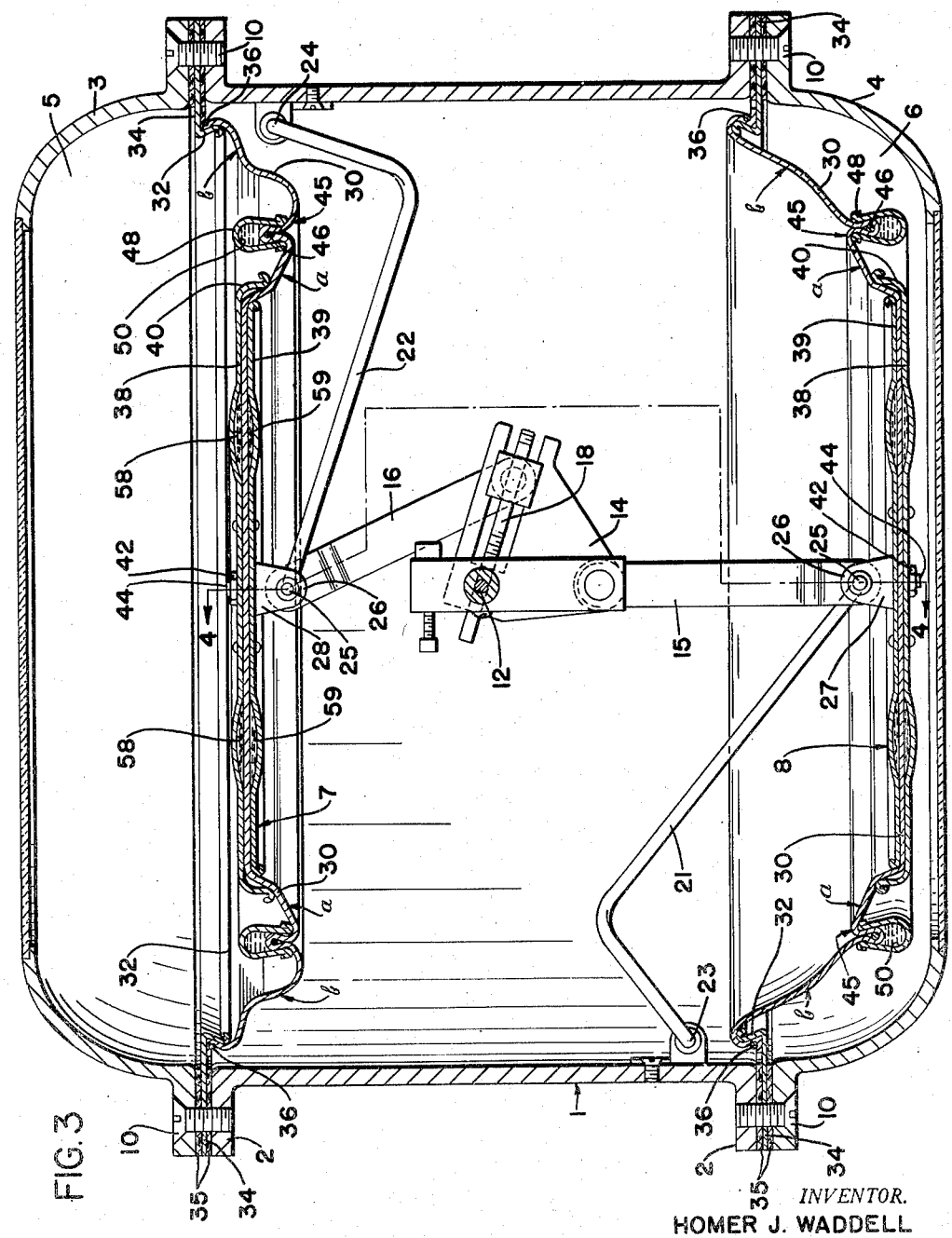

Oct. 15, 1957 H. J. WADDELL 2,809,521
DIAPHRAGM FOR GAS METERS
Filed June 4, 1954 3 Sheets-Sheet 3

INVENTOR.
HOMER J. WADDELL
BY
ATTORNEYS

United States Patent Office 2,809,521
Patented Oct. 15, 1957

2,809,521

DIAPHRAGM FOR GAS METERS

Homer James Waddell, Baltimore, Ohio, assignor to Waddell Incorporated, Baltimore, Ohio, a corporation of Ohio Application June 4, 1954, Serial No. 434,509

6 Claims. (Cl. 73—280)

The present invention relates to improvements in gas meters and particularly to improvements in the construction of the diaphragms which form the flexible walls of the gas holding chambers. The type of gas meter to which the invention is especially adapted is old and well known in the art, being shown in Sprague Patent No. 1,892,520, December 27, 1932, and in Waddell Patent No. 1,788,754, January 13, 1931. This application is a continuation in part of applicant's prior application, Serial No. 346,348, filed April 2, 1953, and now abandoned.

Meters of the type specified are characterized by the provision of a casing in opposite sides of which are located gas chambers, the inner opposed walls of which are formed by flexible diaphragms. Diaphragms are frequently made of soft, flexible leather, to the central portion of which is secured a metallic disk. The outer edge of the diaphragm is fastened to the body of the casing to form the closed chambers which contain the supply of gas.

At the central point of each disk is located an arm, the opposing arms being articulated to a central crank arm which is in turn connected to the standard crankshaft which operates the dials by which the flow of gas is measured and recorded. The flow of gas into and out of the two chambers is controlled by well-known valve mechanism which are so constructed and operated that as the chamber on one side of the meter is being filled with gas from the supply line, the chamber on the other side of the meter is being discharged to the service line. By the mechanism described, the pulsating diaphragms are being constantly deflected back and forth while the meter is in operation. This is a standard type of meter and, except as features thereof enter into the new conception, further description is unnecessary for a full and complete understanding by those skilled in this art.

Leather or a substitute for leather, such as neoprene, has been used for the flexible element of gas meter diaphragms. This is because of its impermeability to gases and the fact that it retains its flexibility longer and more uniformly under all conditions of use. Leather, however, will lose its flexibility in time and, in addition, the constant flexing of the leather back and forth through the space between the outer supporting clamp ring and the disk will cause an early failure of the leather. Leather is always lubricated with an oil dressing before it is inserted in the meter, and attempts have been made to keep the leather lubricated by injecting oil into the meter in the expectation that it will find its way onto the leather, but such oil will often collect in the valves and interfere with the smooth operation of the meter.

It is one of the objects of the invention to provide a means for providing a permanent supply of lubricant to the diaphragm which will not have the objections of the present systems. It is also an object of the invention to provide means whereby there is avoided sharp creasing or pinching of the diaphragm while passing back and forth between the outer clamping ring and the central disk. These steps will prolong the life of the diaphragm and will also contribute to more uniform operation of the meter and less variation in the readings.

Another object of the invention is to provide a diaphragm construction which will give a more complete discharge of gas from each chamber and will accomplish that result more uniformly than has been possible in prior meter constructions. By this means, "fast" meter readings are avoided because with each outward movement of a diaphragm the space in the chamber is more completely filled by the extended diaphragm.

The recited objects have been obtained by a novel construction of the diaphragm as will be described in detail, it being understood that exact adherence to details of construction are not necessary to accomplish the unique results of the invention. Hence, changes and modifications may be made within the scope of the invention as set forth in the claims appended hereto. It will be understood that the invention is not necessarily limited to the form of meter shown, but may be used on other meters in which there are pulsating diaphragms.

In the drawings, in which the preferred form of the invention is shown:

Fig. 1 is a front elevation of a standard meter of the type to which this invention is especially, but not necessarily, adapted.

Fig. 2 is a view of the preferred form of diaphragm assembly removed from the meter.

Fig. 3 is a cross section of a standard form of meter with the two improved diaphragms in place therein, the two diaphragms being shown in their extreme positions. This view is taken on the lines 3—3 of Figs. 1 and 4.

Figure 4:
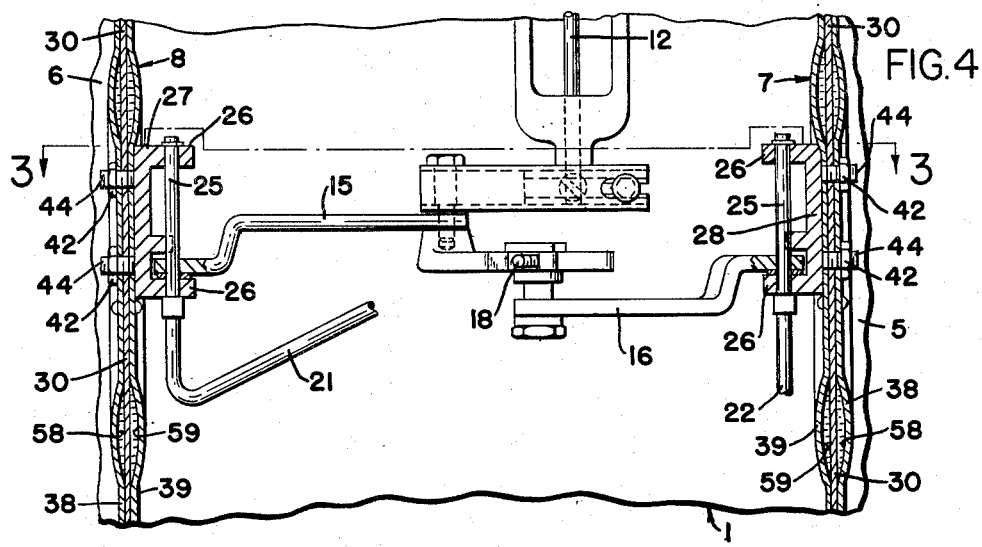
Fig. 4 is a section on the line 4—4 of Fig. 3.

In the drawings, the numeral 1 represents the main body of a standard form of meter which has been selected as the means for employing the new and improved diaphragms. This is a cylindrical body having flanges 2 on either side thereof to which are attached, by screws 10, the two cover plates 3 and 4 which form the outer fixed walls of two gas chambers 5 and 6, respectively. The two diaphragms which form the pulsating walls of the two gas chambers are given the numerals 7 and 8, respectively. In the condition shown in Fig. 3, the chamber 6 has just discharged its gas content while the chamber 5 is completely filled with gas and the diaphragms are at their extreme positions.

In the center of the casing 1 is the crankshaft 12 to which is attached the central crank 14 having articulated thereto a connecting arm 15 which goes to and is pivotally connected to the center of the diaphragm 8. Adjustably connected to the crank 14 is a second arm 16 which goes to the other diaphragm 7, the adjustment being secured by the threaded shaft 18, as is well known in the art. The shaft 12 is connected to and operates the dial 20. Each diaphragm is pivotally connected at the outer end of its connecting lever 15 or 16 to the interior of the casing by a rod 21 or 22 pivoted at 23 or 24 to the casing. The other end of each rod is provided with an extension 25 which passes through legs 26 on plates 27 or 28 attached to the diaphragm, as will be explained. Gas is admitted to and discharged from the chambers through the pipe lines 29, as is customary in this type of meter.

The construction of the two diaphragms is the same and a description of one will be sufficient.

The main body of the diaphragm is made of a soft, flexible, circular sheet 30, which may be leather or a substitute for leather, the outer edge of which is received over a flange 32 on the inner edge of a light metal ring 34. The ring 34 is received between the flange 2 and the outer casing 3 (or 4) and is perforated so as to pass over the screws 10 by which it is clamped in place. Washers 35 are located between the plate 34 and the adjacent parts of the meter.

The flange 32 is bent at an acute angle and in this angle is a wrapping of heavy twine or a wire, indicated by the numeral 36, which holds the diaphragm in place. At the center of the diaphragm are the two nested disks 38 and 39, the former being somewhat larger and provided with an inturned flange 40 about its outer edge. The other disk 39 fits within the flange 40 and between the disks is received the central portion of the diaphragm. The two disks are clamped together on the diaphragm and to the plate 27 or 28 by nuts 42 threaded on bolts 44 extending from the plates and through the disks and the diaphragm.

A leather diaphragm is treated with an oil preservative and lubricant before it is inserted in the meter, but to preserve the diaphragm so that it will remain soft and flexible indefinitely, it is provided with a permanent supply of the lubricant. In the preferred form of the invention, that portion of the diaphragm which lies between the outer ring and the two central disks is folded over, as at 45, about a wire ring 46 to form a permanent loop in the leather. Over this loop is pressed a metal ring 48, U-shaped in cross section, and crimped about the wire 46 so as to remain in place thereon. The interior of the ring 48 forms a chamber or channel 50 which is filled with the lubricant. Lubricants for the purpose are well known and are composed of neat's-foot oil, petrolatum, and sperm oil. Other compositions for the purpose may be employed. The supply of oil seeps into the pores of the leather and keeps the diaphragm soft and flexible.

Figure 5:
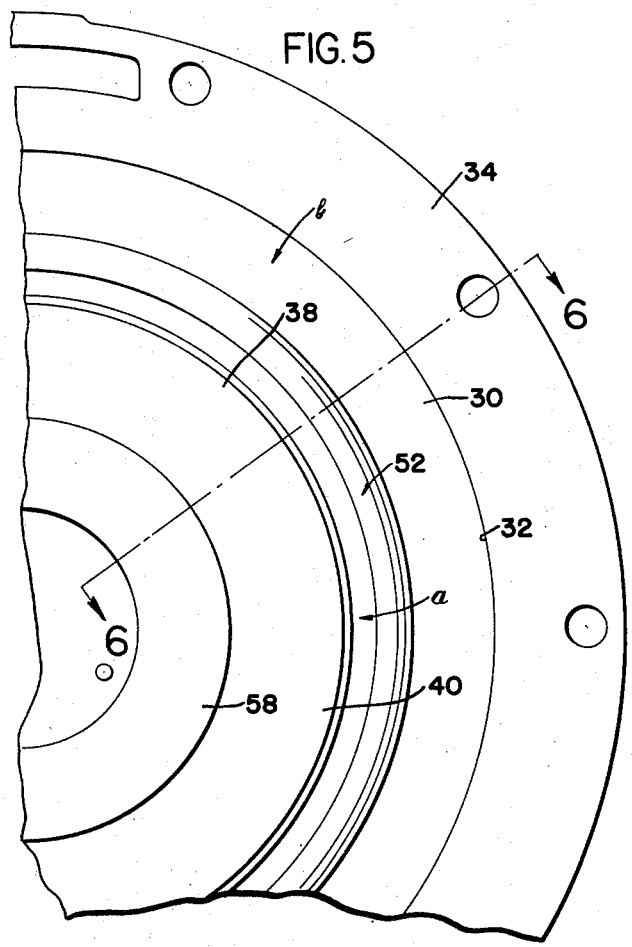
Fig. 5 is a fragmentary view of a modified form of diaphragm.
Figure 6:
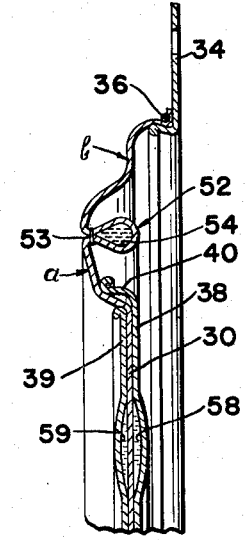
Fig. 6 is a section on the line 6—6 of Fig. 5.

In the form of the invention shown in Figs. 5 and 6, a similar result is obtained by forming a loop 52 in the leather, the line of stitching 53 holding the loop in place, and forming a reservoir 54 in which the supply of lubricant may be held.

In the drawings, the two metal plates 38 and 39 forming the central disk are formed with grooves 58 and 59 therein in which an additional supply of lubricating oil may be held.

In addition to its property as a lubricant supply, the ring 48 has further important functions which are not restricted to leather diaphragms. The ring 48 is carried solely by the diaphragm and is in this sense a floating ring. The movement of the ring to and fro from the position shown at the left to that shown at the right of Fig. 3 is not impeded or restricted by any lever mechanism.

It will be observed from the drawings that area $a$ of the leather diaphragm between the central disks 38 and 39 and the lubricant reservoir has little fullness and is relatively taut, while the area $b$ between the lubricant supply and the outer ring 34 is quite full, providing for a very full bellows effect. The ring 48 passes back and forth through the opening in the ring 34 while the meter is operating and the presence of the ring 48 serves to maintain the fullness of the leather in the area $b$ evenly distributed all around the diaphragm. The result is that the leather in the area $b$ will not tend to be pinched or creased while it is passing back and forth through the space between the outer rim of the central disks and the inner rim of the ring-shaped plate 34. Instead, the area of the leather between the central disk and the outer rim will have a free and uniform rolling action during the pulsating movement of the diaphragm, as the central disks 38 and 39 pass across the plane of the ring-shaped plates 34.

A further object is accomplished by the distribution of the fullness of the diaphragm in the manner set forth. By having a minimum of fullness of the diaphragm in the area $a$, while the area $b$ outside of the ring 48 is quite full, a more complete evacuation of the gas in each chamber will occur at the end of each outward pulsation thereof. This will be seen by observing the condition of the parts at the right hand side of Fig. 3. Because there is very little fullness in the area $a$, the contour of the diaphragm at the end of the outward stroke will more nearly conform to the contour of the outer wall of the chamber and hence a more complete evacuation of gas will be obtained. Conversely, on the return stroke of the diaphragm, the volume of the chamber is somewhat greater because of this differential between the areas $a$ and $b$. These effects are magnified as the leather or other material shrinks from age. This contributes to more accurate meter operation and tends to prevent the meter from running fast.

A meter provided with a diaphragm made in accordance with the invention will have a greatly prolonged diaphragm life because the diaphragm will have a smooth rolling action during the pulsating movement of the diaphragm and lubricant will be constantly supplied to the diaphragm so that the leather will not crack, deteriorate or stiffen. The lubricant chamber in the form of a channel-shaped ring 48 is crimped in place so that it may be removed and a new supply of lubricant be inserted therein. In addition, the presence of the comparatively taut section $a$ around the perimeter of the central disks will insure more accurate meter readings.

It will be seen that certain phases of the invention are not limited to the use of leather as the material of the diaphragm. Neoprene, butyl rubber, or other synthetic rubbers which are notable for their impermeability to gases are suitable for the diaphragms.

What is claimed is:

1. A flexible leather sheet forming the diaphragm of a gas meter, a disk attached to the center of the sheet, a ring attached to the perimeter of the sheet, said sheet having a fold therein between the disk and the ring, and a channel-shaped lubricant reservoir fitting over the fold and adapted to hold a supply of lubricant on the surface of the sheet with the walls of the reservoir sealingly engaging the sheet to hold the lubricant in contact with the surface of the sheet.

2. A flexible diaphragm for a gas meter having an outer fixed ring on the perimeter of the diaphragm, a disk attached to the center of the diaphragm and movable back and forth through the opening in the fixed ring, a floating ring carried by the diaphragm between the fixed ring and the disk, said floating ring being freely movable with the diaphragm to either side of the plane of the fixed ring, and a channel in the floating ring adapted to hold a lubricant in contact with the surface of the diaphragm with the walls of the channel in sealing contact with the surface of the diaphragm.

3. A flexible diaphragm for a gas meter having an outer fixed ring on the perimeter of the diaphragm, a disk attached to the center of the diaphragm and movable back and forth through the opening in the fixed ring, a ring of a diameter intermediate intermediate the fixed ring and the disk carried by the diaphragm between the fixed ring and the disk, the area of the diaphragm between the second-named ring and the disk being relatively taut and the area of the diaphragm between the second-named ring and the fixed ring being full to provide an expansible bellows.

4. A flexible diaphragm for a gas meter having an outer fixed ring on the perimeter of the diaphragm, a disk attached to the center of the diaphragm and movable back and forth through the opening in the fixed ring, a floating ring carried by the diaphragm between the fixed ring and the disk, the area of the diaphragm between the floating ring and the disk being relatively taut and the area of the diaphragm between the floating ring and the fixed ring being full to provide an expansible bellows, said floating ring being freely movable with the diaphragm to either side of the plane of the fixed ring.

5. A flexible diaphragm for a gas meter having an outer ring on the perimeter of the diaphragm, a disk attached to the center of the diaphragm, and a closed ring-shaped fold formed in the body of the diaphragm between the ring and the disk and constituting a chamber to hold a lubricant and supply it to the diaphragm, said fold being movable with the diaphragm to either side of the plane of the ring.

6. A flexible diaphragm for a gas meter having an outer ring on the perimeter of the diaphragm, a disk attached to the center of the diaphragm, and a closed ring-shaped fold formed in the body of the diaphragm between the ring and the disk and constituting a chamber to hold a lubricant and supply it to the diaphragm, said fold being movable with the diaphragm to either side of the plane of the ring, the area of the diaphragm between the disk and the fold being relatively taut and the area of the diaphragm between the fold and the ring being full to provide an expansible bellows.

References Cited in the file of this patent

UNITED STATES PATENTS

| | | | |
|---|---|---|---|
| 1,066,023 | Lawson | July 1, | 1913 |
| 1,096,296 | Fulton | May 12, | 1914 |
| 1,278,268 | Wiechmann | Sept. 10, | 1918 |
| 1,611,105 | Dickey | Dec. 14, | 1926 |
| 1,664,193 | Cooke et al. | Mar. 27, | 1928 |
| 1,712,697 | Frankenberg | May 14, | 1929 |
| 2,275,712 | Zand | Mar. 10, | 1942 |
| 2,658,526 | Porter | Nov. 10, | 1953 |
| 2,693,701 | Whitworth | Nov. 9, | 1954 |

FOREIGN PATENTS

| | | | |
|---|---|---|---|
| 110,969 | Germany | Jan. 19, | 1899 |
| 239,641 | Great Britain | Sept. 17, | 1925 |
| 21,338 | Great Britain | | 1899 |